US008982546B2

(12) United States Patent   (10) Patent No.: US 8,982,546 B2
Lin et al.   (45) Date of Patent: Mar. 17, 2015

(54) ELECTRONIC DEVICE (71) Applicant: Quanta Computer Inc., Taoyuan Shien (TW)

(72) Inventors: Mao-Sung Lin, Taoyuan Shien (TW); Chien-Fa Huang, Taoyuan Shien (TW); Mao-Chen Hsiao, New Taipei (TW); Jeng-Jiun Chen, Taoyuan Shien (TW)

(73) Assignee: Quanta Computer Inc., Taoyuan Shien (TW)

( * ) Notice: Subject to any disclaimer, the term of this patent is extended or adjusted under 35 U.S.C. 154(b) by 227 days.

(21) Appl. No.: 13/724,724

(22) Filed: Dec. 21, 2012

(65) Prior Publication Data

US 2014/0153177 A1 Jun. 5, 2014

(30) Foreign Application Priority Data

Dec. 5, 2012 (TW) ................. 101145649 A (51) Int. Cl.
*G06F 1/16* (2006.01)
(52) U.S. Cl.
CPC .................... *G06F 1/1601* (2013.01)
USPC ............. 361/679.21; 361/679.26; 361/679.3; 361/679.56; 349/58

(58) Field of Classification Search
CPC ....... G06F 1/16; G06F 1/1601; G06F 1/1626; G06F 1/1637
See application file for complete search history.

(56) References Cited

U.S. PATENT DOCUMENTS

| 5,808,707 | A | * | 9/1998 | Niibori et al. .................. 349/60 |
| 6,532,152 | B1 | * | 3/2003 | White et al. .................. 361/692 |
| 6,560,092 | B2 | * | 5/2003 | Itou et al. .................. 361/679.55 |
| 8,250,724 | B2 | * | 8/2012 | Dabov et al. .................. 29/428 |
| 2004/0156168 | A1 | * | 8/2004 | LeVasseur et al. ............ 361/681 |
| 2008/0165485 | A1 | * | 7/2008 | Zadesky et al. ............... 361/683 |
| 2010/0061040 | A1 | * | 3/2010 | Dabov et al. ............. 361/679.01 |
| 2012/0162950 | A1 | * | 6/2012 | Liu ............... 361/807 |
| 2013/0021280 | A1 | * | 1/2013 | Dabov et al. .................. 345/173 |

* cited by examiner

*Primary Examiner* — Anthony Q Edwards
(74) *Attorney, Agent, or Firm* — Rabin & Berdo, P.C.

(57) ABSTRACT

An electronic device is disclosed, which includes a touch display module, a frame for placing the touch display module, plural elastic pieces extended from a sidewall of the frame, a casing, a fastener, and plural adjusting screws. The fastener fastens the frame to the casing. The adjusting screws are inserted in the elastic pieces and are screwed in the casing. The depth of the adjusting screws screwed in the casing can be adjusted for adjusting a relative height between the touch display module and the casing.

16 Claims, 6 Drawing Sheets

ELECTRONIC DEVICE

RELATED APPLICATIONS

This application claims priority to Taiwan Application Serial Number 101145649, filed Dec. 5, 2012, which is herein incorporated by reference.

BACKGROUND

1. Field of Invention

The present invention relates to an electronic device. More particularly, the present invention relates a electronic device with touch sensing function.

2. Description of Related Art

A modern touch display module has advantages, such as being user-friendly, fast response times, compact size, etc. The touch panel may provide users a convenient and intuitive way to manipulate an electronic device. Therefore, touch panels are widely used in all kinds of consumer electronics, e.g., e-books, personal digital assistants (PDAs), smart phones, laptop computers, point of sale (POS) systems, etc.

In general, a touch display module includes a display panel and a touch panel disposed on the display panel. A transparent touch sensor film is adhered on the display panel, so as to realize touch sensing and display functions at the same time.

With the development of the touch sensing device, the size of the touch panel is usually larger than the size of the display panel in order to provide better touch sensing feeling. One of the methods to fasten the touch display module on a casing is adhering the protruded edge of the touch panel on the casing. However, the cost and size of the touch panel are difficult to be reduced. Another method is firstly adhering the touch panel to the display panel and then assembling the touch display module to the casing. However, there would be a gap formed at an interface between the touch panel and the casing. Users may feel uncomfortable while fingers crossing the interface between the touch panel and the casing because of the gap.

SUMMARY

The present invention provides an electronic device, in which a relative height between a touch display module and a casing can be adjusted to solve the problem caused by the gap formed between the upper surface of the touch display module and the casing.

An aspect of the invention provides an electronic device, which includes a touch display module, a frame for receiving the touch display module, a plurality of elastic pieces, at least one fastener, and a plurality of adjusting screws. The frame includes a bottom plate, and a sidewall standing around the bottom plate. The elastic pieces are extended from the sidewall. The fastener is utilized for fastening the frame on the casing. The adjusting screws pass through the elastic pieces and are screwed in the casing. A depth of the adjusted screws screwed in the casing is adjustable for adjusting a relative height between the touch display module and the casing.

The casing includes a front casing and a back casing coupled to the front casing, and the elastic pieces are disposed between the front casing and the back casing. Each of the elastic pieces includes a fastening hole and an adjusting hole, and a distance between a center of the touch display module and the adjusting hole is smaller than a distance between the center of the touch display module and the fastening hole. The fastener can be a plurality of fastening screws, and the back casing may include a plurality of first screwing portions for being screwed to the fastening screws and a plurality of second screwing portions for being screwed to the adjusting screws. The front casing may include a plurality of openings, and the fastening screws pass through fastening holes and are screwed to the first screwing portions respectively. The adjusting screws pass through the openings and the adjusting holes and are screwed to the second screwing portions respectively. The elastic pieces are fastened between the fastening screws and the first screwing portions. The fastener may be a plurality of fastening screws, and the front casing may include a plurality of first screwing portions for being screwed to the fastening screws and a plurality of second screwing portions for being screwed to the adjusting screws. The fastening screws pass through the fastening holes and are screwed to the first screwing portions respectively, and the adjusting screws pass through the adjusting holes and are screwed to the second screwing portions respectively. A distance from a top surface of the elastic pieces to the bottom plate can be smaller than a distance from a top surface of the touch display module to the bottom plate. The touch display module may include a touch panel, a display panel, and an adhesive layer for adhering the touch panel to the display panel, in which a size of the touch panel is smaller than a size of the display panel. The electronic device may further include a printed circuit board, an extending piece connected to the frame, and a flexible circuit board passing through the extending piece for connecting the touch display module to the printed circuit board. The fastener may include an adhesive for adhering the extending piece to the front casing, in which the adjusting screws are disposed between the adhesive and the touch display module. The fastener may include a through hole disposed on the extending piece and a hook disposed on the front casing, the hook passing through the through hole and coupled to the extending piece, in which the adjusting screws are disposed between the hook and the touch display module.

The frame and the touch display module thereon can be fastened to the casing with the fastener. The depth of the adjusting screw screwed into the casing can be adjusted to relax or press the elastic piece extended from the frame thereby adjusting the relative height between the touch display module and the casing flexibly. Such that the upper surface of the touch display module can be approximately coplanar disposed with the upper surface of the casing in order to prevent the user discomfort due to the gap between the upper surface of the touch display module and the upper surface of the casing.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

In order to reduce a gap between the touch panel and the casing of an electronic device, a touch display module is assembled in a frame in the present application, and there is an elastic piece extended from the frame. The frame is fastened to the casing with a fastener, and then an adjustable screw passes through the elastic piece and is screwed to the casing. The depth of the adjusting screw crewed into the casing can be adjusted flexibly for adjusting a relative height between the touch display module and the casing. So that the uncomfortable operation due to the gap between the touch panel and the casing con be prevented.

Figure 1:
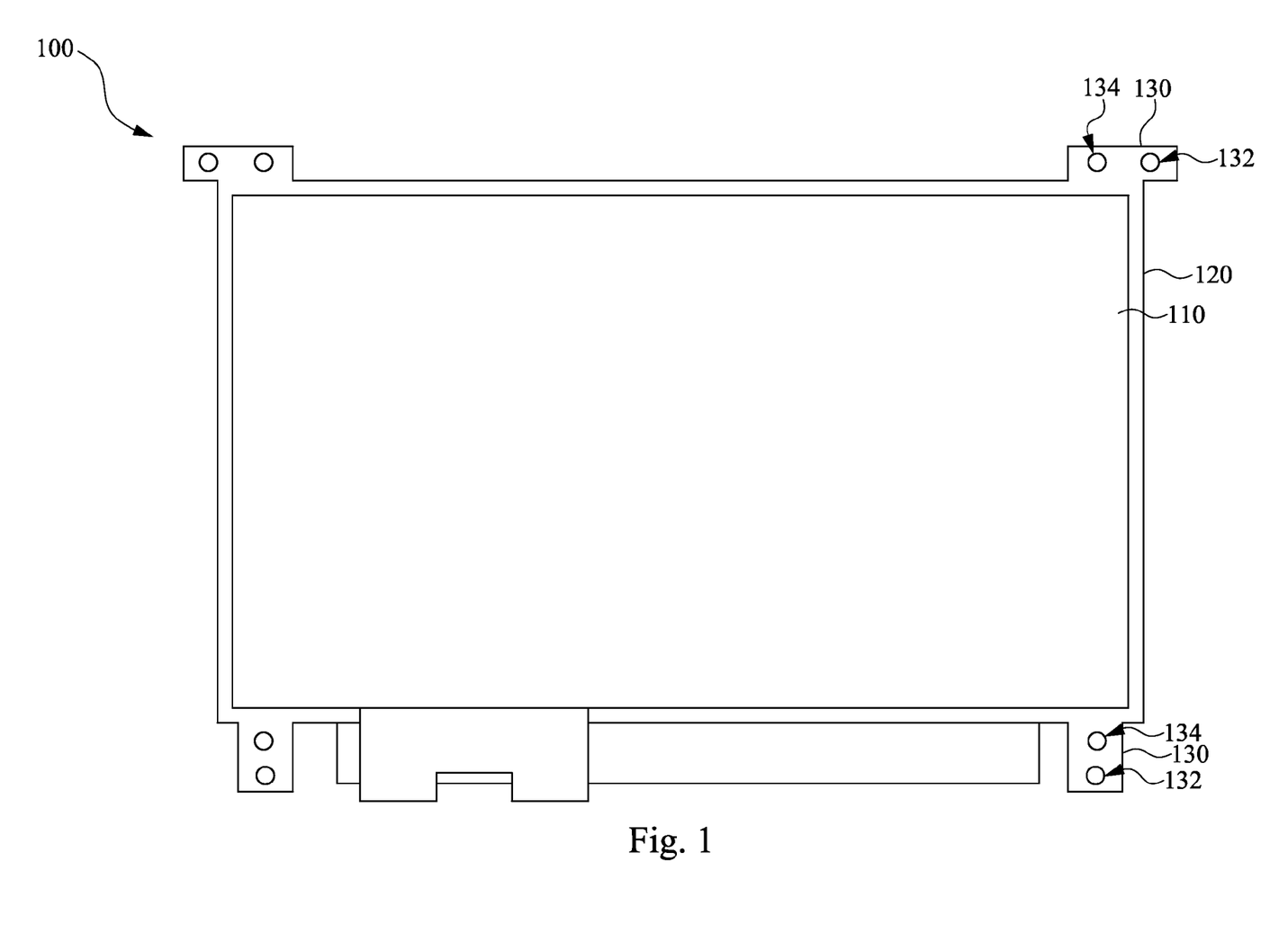
FIG. 1 is a top view of a first embodiment of an electronic device of the invention.

FIG. 1 is a top view of a first embodiment of an electronic device of the invention. The electronic device 100 includes a touch display module 110, a frame 120, and a casing. In order to clearly show the features of the present disclosure, the casing is not shown in this figure. The touch display module 110 is received in the frame 120. The electronic device 100 further includes a plurality of elastic pieces 130 extended from the frame 120 for adjusting a relative height between the touch display module 110 and the casing. The elastic pieces 130 can be one-pieced formed with the frame 120. The number of the elastic pieces 130 is at least three. There are four elastic pieces 130 in this embodiment, and the elastic pieces 130 are equally disposed on the frame 120. For example, two opposite sides of the frame are disposed with two elastic pieces 130 respectively. Users may also change the position of the elastic pieces 130 according to different designs. For example, four sides of the frame 120 are disposed the elastic pieces 130 respectively, or the elastic pieces 130 can be arranged asymmetrically.

Each of the elastic pieces 130 has a fastening hole 132 and an adjusting hole 134. A distance between the adjusting hole 134 and a center of the touch display module 110 can be greater than, smaller than or equal to a distance between the fastening hole 132 and the center of the touch display module 110. The distance between the adjusting hole 134 and a center of the touch display module 110 is preferably smaller than the distance between the fastening hole 132 and the center of the touch display module 110 in this embodiment. Namely, the adjusting hole 134 is disposed inner than the fastening hole 132. Users may also change the relative position of the fastening hole 132 and the adjusting hole 134 according to different requirement. In other embodiments, the fastening hole 132 and the adjusting hole 134 can be disposed on different elastic pieces 130, or the fastening hole 132 can be omitted.

Details of how the electronic device 100 adjusts the relative height between the touch display module 110 and the casing via the elastic pieces 130 would be disclosed in following embodiments.

Figure 2:
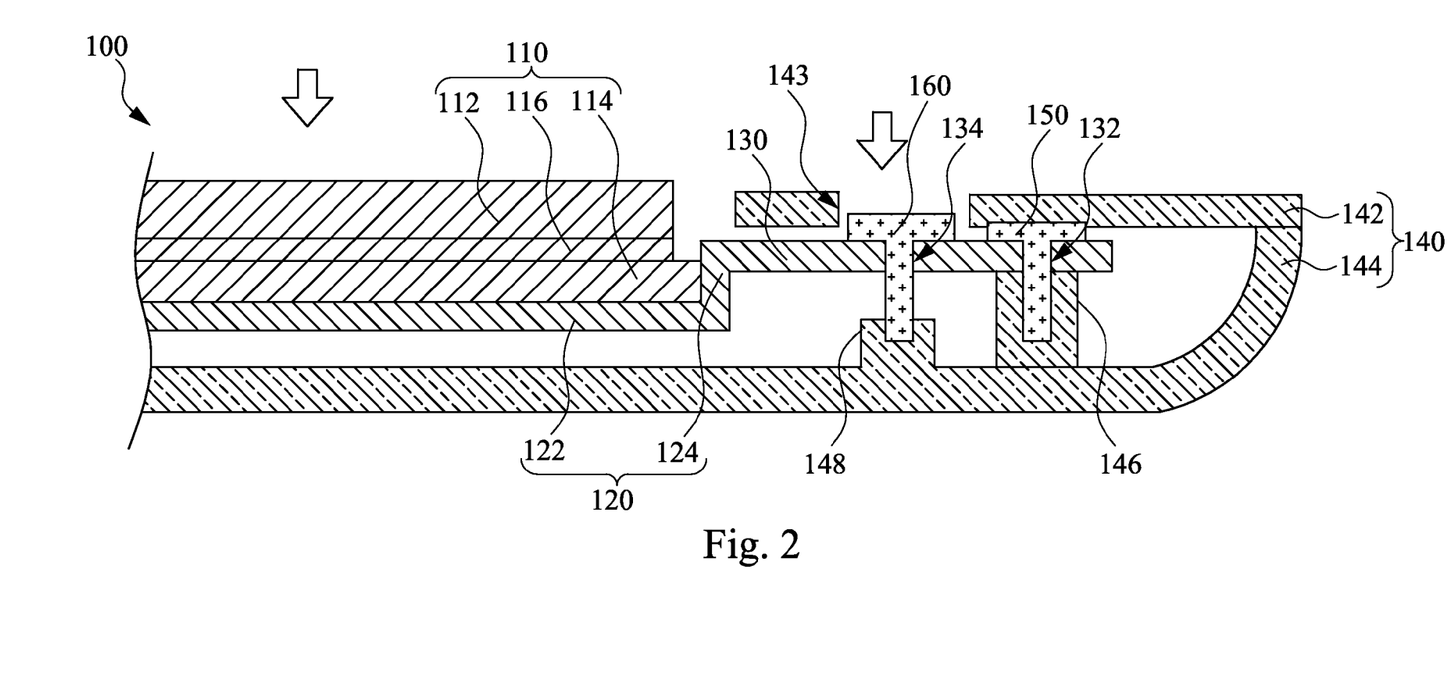
FIG. 2 to FIG. 6 are partial sectional views of different embodiment of the electronic device of the invention.

FIG. 2 is a partial sectional view of a second embodiment of the electronic device 100 of the invention. The electronic device 100 includes the touch display panel 110, the frame 120, the elastic pieces 130, the casing 140, a fastener, and an adjusting screw 160. The touch display module 110 includes a touch panel 112, a display panel 114, and an adhesive layer 116 for adhering the touch panel 112 to the display panel 114. The size of the touch panel 112 is smaller than the size of the display panel 114. The touch display panel 110 is assembled in the frame 120.

The frame 120 includes a bottom plate 122, and a sidewall 124 standing around the bottom plate 112. The elastic piece 130 can be one-piece formed with the frame 120. The elastic piece 130 is extended form the sidewall 124 and is substantially parallel to the bottom plate 122. The elastic piece 130 has the fastening hole 132 and the adjusting hole 134. The casing 140 includes a front casing 142 and a back casing 144. The front casing 142 can be coupled to the back casing 144 via coupling structure, such as hooks. The front casing 142 is a hollow structure to show the touch display module 110. The elastic piece 130 is disposed between the front casing 142 and the back casing 144. The fastener can be a fastening screw 150.

When the electronic device 100 is assembled, the touch display module 110 is assembled and fastened in the frame with an adhesive, and the frame 120 is fixed on the casing with the fastening screw 150. The adjusting screw 160 is further passed through the elastic piece 130 and is screwed in the casing 140. The depth of the adjusting screw 160 screwed in the casing 140 can be adjusted to adjust the relative height between the touch display module 110 and the casing 140.

More particularly, the back casing 144 includes plural first screwing portions 146 and plural second screwing portions 148 (only one of them is shown in the figure). The position of the first screwing portion 146 is corresponding to the position of the fastening hole 132. The position of the second screwing portion 148 is corresponding to the position of the adjusting hole 134. The fastening screw 150 passes through the fastening hole 132 and is screwed to the first screwing portion 146 for fastening the elastic piece 130 between the fastening screws 150 and the first screwing portion 146. The depth of the fastening screw 150 screwed into the first screwing portion 146 is at least for fastening the frame 120 connected to the elastic piece 130 and the touch display module 110 thereon.

Then, the front casing 142 is coupled to the back casing 144 by hooks. The front casing 142 has an opening 143 disposed corresponding to the adjusting hole 134. An inner diameter of the opening 143 is greater than an outer diameter of the adjusting screw 160. The adjusting screw 160 further passes through the adjusting hole 134 and is screwed to the second screwing portion 148. The depth of the adjusting screw 160 screwed into the second screwing portion 148 can be adjusted to adjust the relative height between the touch display module 110 and the front casing 142.

For example, if the touch display module 110 is higher than the front casing 142 after the fastening screw 150 is screwed on the back casing 144, the adjusting screw 160 can be slightly further screwed into the second screwing portion 148 for leading the elastic piece 130 moving downward. Such that the frame 120 connected to the elastic frame 130 and the touch display module 110 thereon can be moved downward in order to make the upper surface of the touch display module 110 and the upper surface of the front casing 142 at approximately same height, i.e. the upper surface of the touch display module 110 and the upper surface of the front casing 142 are coplanar disposed.

Detail operations of how the adjusting screw 160 adjusts the relative height between the touch display module 110 and the casing 140 via the depth of the adjusting screw 160 screwed in the casing 140 are disclosed in the present embodiment. Following embodiments would discuss the variations of the structure of the electronic device 100, and the operation of how to adjust the relative height between the touch display module 110 and the casing 140 would not be discussed.

Figure 3:
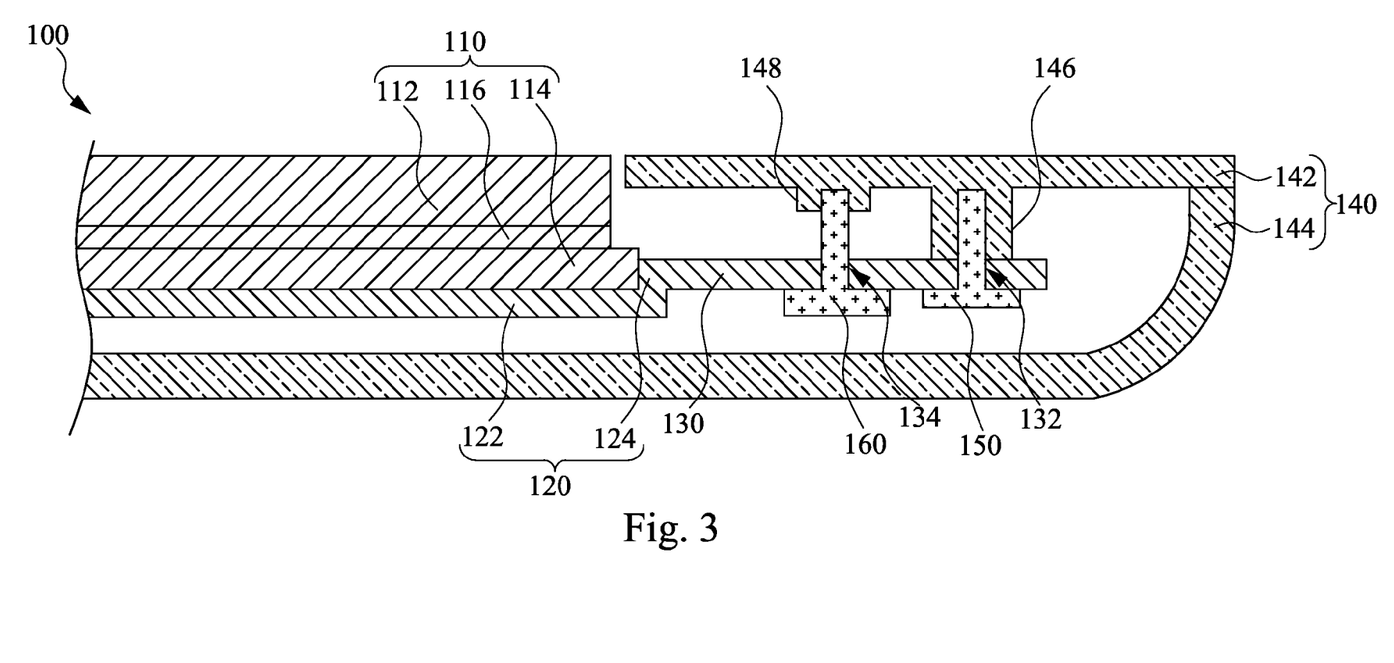

FIG. 3 is a partial sectional view of a third embodiment of the electronic device 100 of the invention. In this present embodiment, the first screwing portion 146 and the second screwing portion 148 are disposed on the front casing 142. The position of the first screwing portion 146 is corresponding to the fastening hole 132, and the position of the second screwing portion 148 is corresponding to the adjusting hole 134. The front casing 142 does not include the opening 143 as shown in FIG. 2. When the electronic device 100 is assembled, the fastening screw 150 passes through the fastening hole 132 and is screwed on the first screwing portion 146 for fastening the elastic piece 130 and the frame 120 connected to the elastic piece 130 on the front casing 142. Then the adjusting screw 160 is utilized for adjusting the position of the touch display module 110 in order to make the upper surface of the touch display module 110 and the upper surface of the front casing 142 at the same height. Then the back casing 144 is coupled to the front casing 142. Similarly, if the touch display module 110 is lower than the front casing 142 after the fastening screw 150 is screwed on the back casing 144, the adjusting screw 160 can be slightly further screwed into the second screwing portion 148 for leading the elastic piece 130 moving upward. Such that the frame 120 connected to the elastic frame 130 and the touch display module 110 thereon can be moved upward in order to make the upper surface of the touch display module 110 and the upper surface of the front casing 142 at approximately same height, i.e. the upper surface of the touch display module 110 and the upper surface of the front casing 142 are coplanar disposed.

Detail operations of how the adjusting screw 160 adjusts the relative height between the touch display module 110 and the casing 140 via the depth of the adjusting screw 160 screwed in the casing 140 are disclosed in above embodiments. Following embodiments would discuss the variations of the structure of the electronic device 100, and the operation of how to adjust the relative height between the touch display module 110 and the casing 140 would not be discussed.

Figure 4:
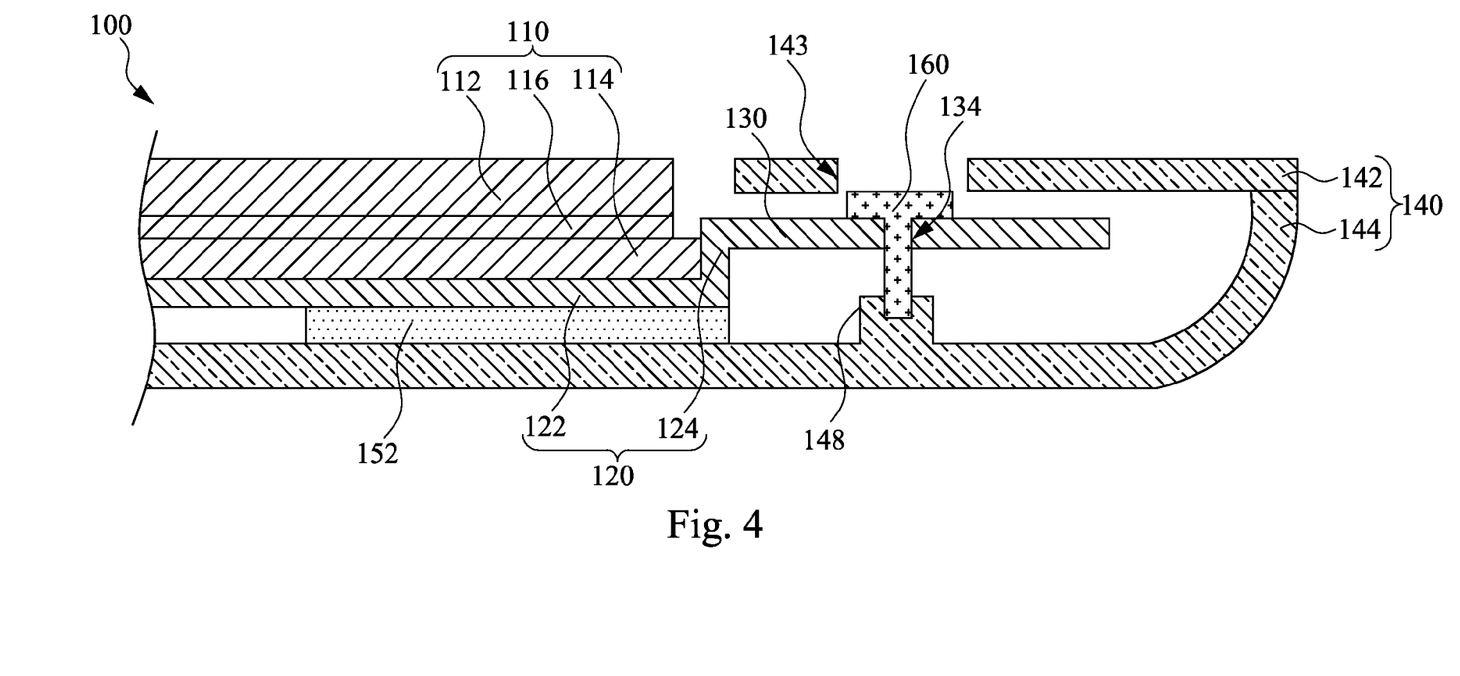

FIG. 4 is a partial sectional view of a fourth embodiment of the electronic device 100 of the invention. In the present embodiment, the fastener is a glue 152. The fastening hole can be omitted in this embodiment. The back frame 144 has the second screwing portion 148 disposed corresponding to the adjusting hole 134. When the electronic device 100 is assembled, the frame 120 adhered on the back casing 144 with the glue 152, in which the glue 152 is preferably an elastic and compressible material, such as a foaming double-sided tape. The front casing 142 is further coupled to the back casing 144. Then the adjusting screw 160 passes through the adjusting hole 134 of the elastic piece 130 via the opening 143 of the front casing 142, and the adjusting screw 160 is further screwed in the second screwing portion 148 of the back casing 144. Similarly, the position of the touch display module 110 can be adjusted via the adjusting screw 160 in order to make the upper surface of the touch display module 110 and the upper surface of the front casing 142 at approximately the same height.

Figure 5:
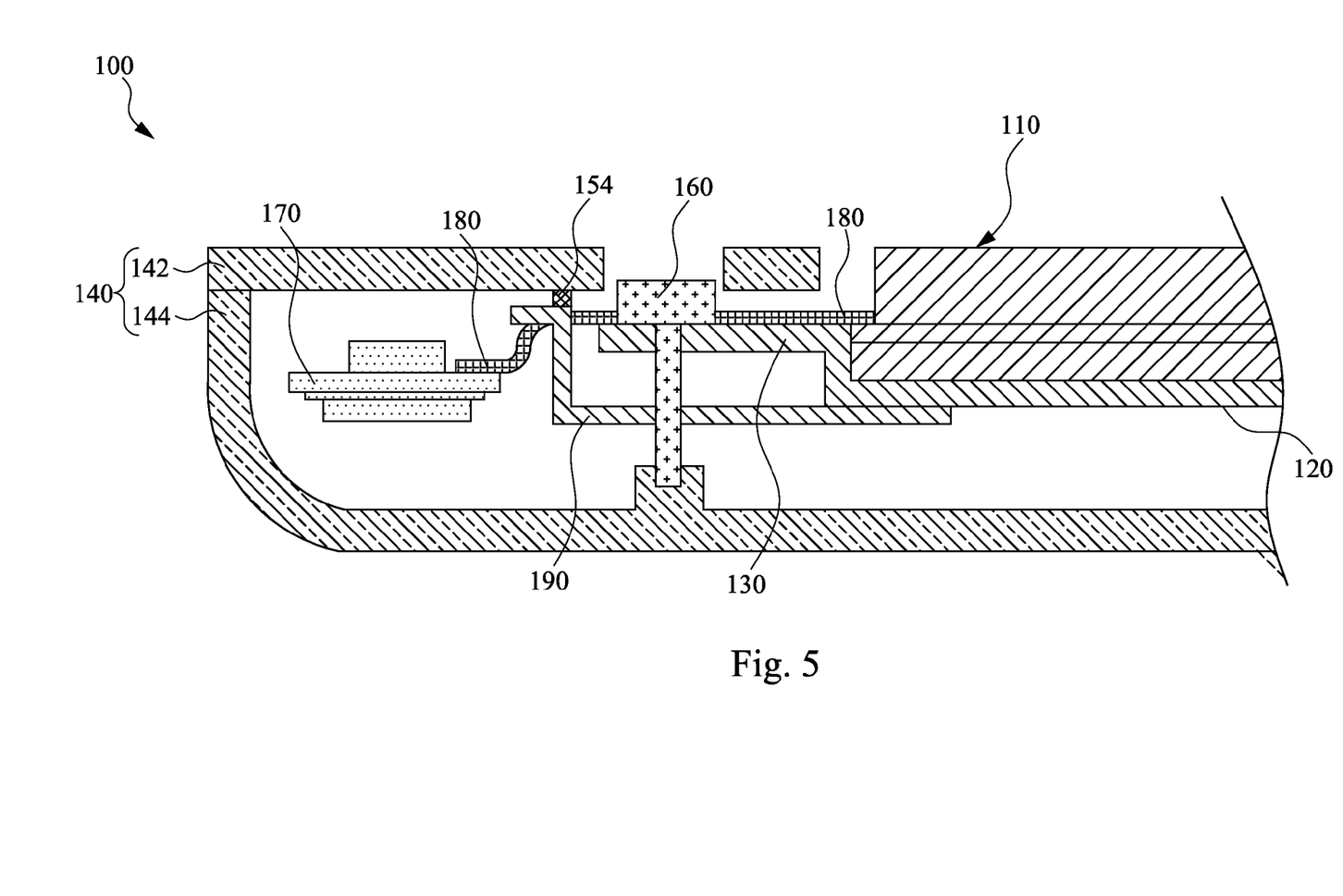

FIG. 5 is a partial sectional view of a fifth embodiment of the electronic device 100 of the invention. The electronic device 100 further includes a printed circuit board 170 and a flexible circuit board 180 for connecting the touch display module 110 to the printed circuit board 170. The electronic device 100 further includes an extending piece 190. The extending piece 190 is connected to the frame 120. The extending piece 190 can be one-piece formed with the frame 120. The extending piece 190 can be fixed on the frame 120 via welding, adhering, embedding, or screwing process. The flexible circuit board 180 may pass through a breaking portion of the extending piece 190 to connect the touch display module 110 to the printed circuit board 170.

In this embodiment, the fastener can be an adhesive 154. The adhesive 154 is utilized for adhering the extending piece 190 on the front casing 142. The extending length of the extending piece 190 is greater than the extending length of the elastic piece 130 thereby allowing the adjusting screw 160 disposed between the adhesive 154 and the touch display module 110. The adjusting screw 160 can be screwed on the front casing 142 or the back casing 144.

Figure 6:
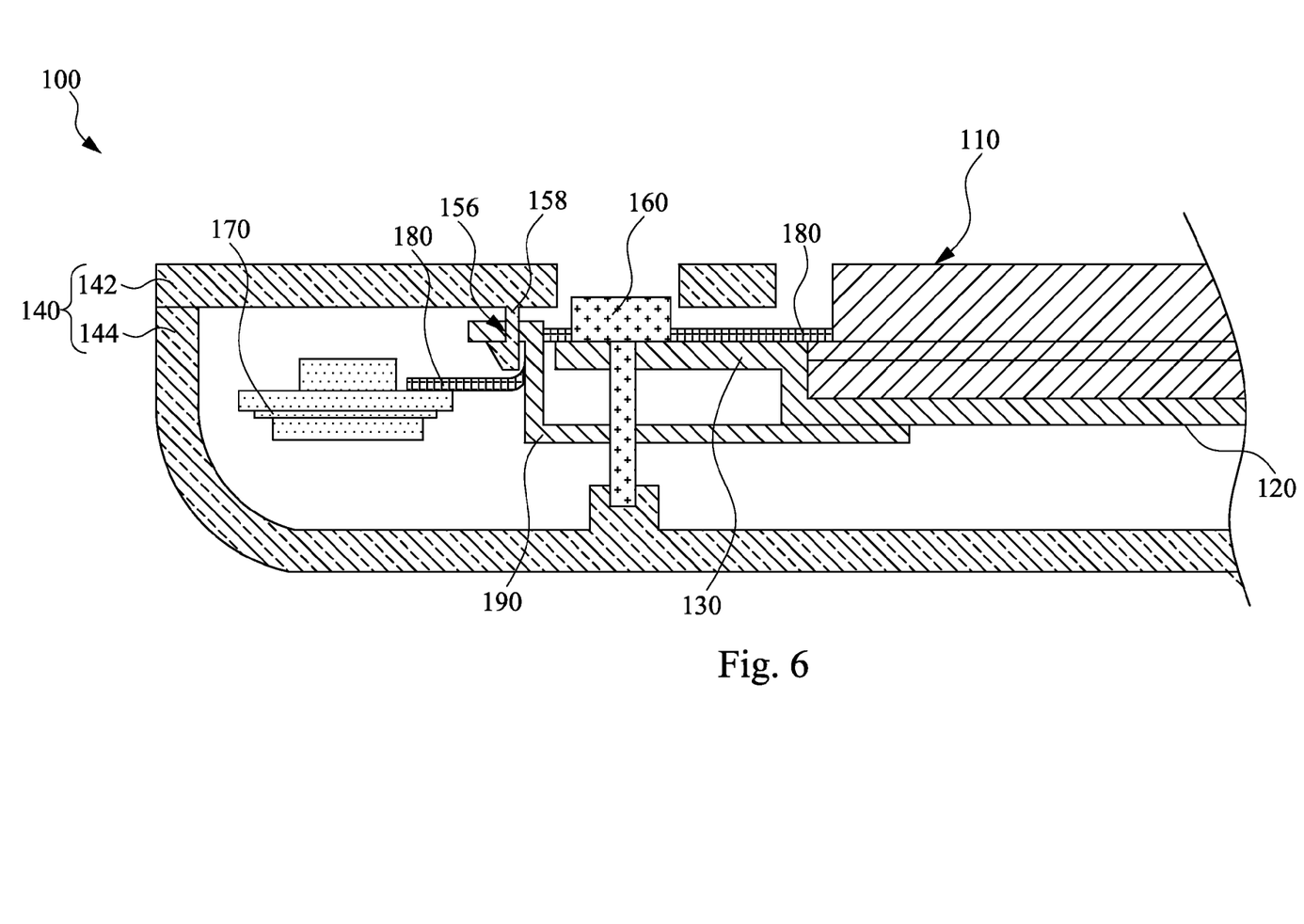

FIG. 6 is a partial sectional view of a sixth embodiment of the electronic device 100 of the invention. The electronic device 100 further includes the printed circuit board 170 and the flexible circuit board 180 for connecting the touch display module 110 to the printed circuit board 170. The electronic device 100 further includes the extending piece 190. The extending piece 190 is connected to the frame 120. The extending piece 190 can be one-piece formed with the frame 120. The extending piece 190 can be fixed on the frame 120 via welding, adhering, embedding, or screwing process. The flexible circuit board 180 may pass through a breaking portion of the extending piece 190 to connect the touch display module 110 to the printed circuit board 170.

In this embodiment, the fastener includes a through hole 156 formed on the extending portion 190, and a hook 158 disposed on the front casing 142. The hook 158 disposed on the front casing 12 may pass through the through hole 156 and be coupled to the extending piece 190 thereby fastening the extending piece 190, the frame 120 connected to the extending piece 190, and the touch display module 110 disposed on the frame 120. The extending length of the extending piece 190 is greater than the extending length of the elastic piece 130 thereby allowing the adjusting screw 160 disposed between the adhesive 154 and the touch display module 110. The adjusting screw 160 can be screwed on the front casing 142 or the back casing 144.

The frame and the touch display module thereon can be fastened to the casing with the fastener. The depth of the adjusting screw screwed into the casing can be adjusted to relax or press the elastic piece extended from the frame thereby adjusting the relative height between the touch display module and the casing flexibly. Such that the upper surface of the touch display module can be approximately coplanar disposed with the upper surface of the casing in order to prevent the user discomfort due to the gap between the upper surface of the touch display module and the upper surface of the casing.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. An electronic device comprising:
  a touch display module;
  a frame for receiving the touch display module, the frame comprising a bottom plate, and a side all standing around the bottom plate;
  a plurality of elastic pieces extended from the sidewall, wherein each of the elastic pieces comprises a fastening hole and an adjusting hole;
  a casing comprising a front casing and a back casing coupled to the front casing, wherein the front casing comprises a plurality of openings, the back casing com- prises a plurality of first screwing portions and a plurality of second screwing portions;
at least one fastener for fastening the frame on the casing, wherein the least one fastener comprises a plurality of fastening screws, and
a plurality of adjusting screws passing through the elastic pieces and screwed in the casing, wherein the fastening screws pass through fastening holes and are screwed to the first screwing portions respectively, and the adjusting screws through the openings and the adjusting holes and are screwed to the second screwing portions respectively, wherein a depth of the adjusted screws screwed in the casing is adjustable for adjusting a relative height between the touch display module and the casing.

2. The electronic device of claim 1, wherein the elastic pieces are disposed between the front casing and the back casing.

3. The electronic device of claim 1, wherein a distance between a center of the touch display module and the adjusting hole is smaller than a distance between the center of the touch display module and the fastening hole.

4. The electronic device of claim 1, wherein the elastic pieces are fastened between the fastening screws and the first screwing portions.

5. The electronic device of claim 1, wherein a distance from a top surface of the elastic pieces to the bottom plate is smaller than a distance from a top surface of the touch display module to the bottom plate.

6. The electronic device of claim 1, wherein the touch display module comprises:
a touch panel;
a display panel; and
an adhesive layer for adhering the touch panel to the display panel, wherein a size of the touch panel is smaller than a size of the display panel.

7. The electronic device of claim 1, further comprising:
a printed circuit board;
an extending piece connected to the frame;
a flexible circuit board passing through the extending piece for connecting the touch display module to the printed circuit board; and
the fastener comprising an adhesive for adhering the extending piece to the front casing, wherein the adjusting screws are disposed between the adhesive and the touch display module.

8. The electronic device of claim 1, further comprising:
a printed circuit board;
an extending piece connected to the frame;
a flexible circuit board passing through the extending piece for connecting the touch display module to the printed circuit board; and
the fastener comprising a through hole disposed on the extending piece and a hook disposed on the front casing, the hook passing through the through hole and coupled to the extending piece, wherein the adjusting screws are disposed between the hook and the touch display module.

9. An electronic device comprising:
a touch display module;
a frame for receiving the touch display module, the frame comprising a bottom plate, and a sidewall standing around the bottom plate;
a plurality of elastic pieces extended from the sidewall, wherein each of the elastic pieces comprises a fastening hole and an adjusting hole;
a casing comprising a front casing and a back casing coupled to the front casing, wherein the front casing comprises a plurality of first screwing portions and a plurality of second screwing portions;
at least one fastener for fastening the frame on the casing, wherein the least one fastener comprises a plurality of fastening screws; and
a plurality of adjusting screws passing through the elastic pieces and screwed in the casing, wherein the fastening screws pass through the fastening holes and are screwed to the first screwing portions respectively, and the adjusting screws pass through the adjusting holes and are screwed to the second screwing portions respectively, wherein a depth of the adjusted screws screwed in the casing is adjustable for adjusting a relative height between the touch display module and the casing.

10. The electronic device of claim 9, wherein the elastic pieces are disposed between the front casing and the back casing.

11. The electronic device of claim 9, wherein a distance between a center of the touch display module and the adjusting hole is smaller than a distance between the center of the touch display module and the fastening hole.

12. The electronic device of claim 9, wherein the elastic pieces are fastened between the fastening screws and the first screwing portions.

13. The electronic device of claim 9, wherein a distance from a top surface of the elastic pieces to the bottom plate is smaller than a distance from a top surface of the touch display module to the bottom plate.

14. The electronic device of claim 9, wherein the touch display module comprises:
a touch panel;
a display panel; and
an adhesive layer for adhering the touch panel to the display panel, wherein a size of the touch panel is smaller than a size of the display panel.

15. The electronic device of claim 9, further comprising:
a printed circuit board;
an extending piece connected to the frame;
a flexible circuit board passing through the extending piece for connecting the touch display module to the printed circuit board; and
the fastener comprising an adhesive for adhering the extending piece to the front casing, wherein the adjusting screws are disposed between the adhesive and the touch display module.

16. The electronic device of claim 9, further comprising:
a printed circuit board;
an extending piece connected to the frame;
a flexible circuit board passing through the extending piece for connecting the touch display module to the printed circuit board; and
the fastener comprising a through hole disposed on the extending piece and a hook disposed on the front casing, the hook passing through the through hole and coupled to the extending piece, wherein the adjusting screws are disposed between the hook and the touch display module.

* * * * *